US011209658B2

(12) United States Patent
Hong

(10) Patent No.: US 11,209,658 B2
(45) Date of Patent: Dec. 28, 2021

(54) VIRTUAL IMAGE DISPLAY APPARATUS, VEHICLE COMPRISING HEAD-UP DISPLAY APPARATUS COMPRISING VIRTUAL IMAGE DISPLAY APPARATUS, AND METHOD FOR VIRTUAL IMAGE DISPLAY

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 770 days.

(21) Appl. No.: 16/067,782

(22) PCT Filed: Dec. 7, 2017

(86) PCT No.: PCT/CN2017/115076
§ 371 (c)(1),
(2) Date: Jul. 2, 2018

(87) PCT Pub. No.: WO2019/006985
PCT Pub. Date: Jan. 10, 2019

(65) Prior Publication Data
US 2021/0208409 A1  Jul. 8, 2021

(30) Foreign Application Priority Data
Jul. 6, 2017  (CN) .......................... 201710546030.6

(51) Int. Cl.
G09G 5/00  (2006.01)
G02B 27/01  (2006.01)
(Continued)

(52) U.S. Cl.
CPC .......... *G02B 27/0179* (2013.01); *B60K 35/00* (2013.01); *G02B 27/0093* (2013.01);
(Continued)

(58) Field of Classification Search
CPC ...................................................... A61B 5/398
See application file for complete search history.

(56) References Cited

U.S. PATENT DOCUMENTS 10,120,438 B2 * 11/2018 Osman ..................... G06F 1/325
2004/0148023 A1 *  7/2004 Shu ........................ A61F 2/1629
623/6.34
(Continued)

FOREIGN PATENT DOCUMENTS

CN  102224443 A  10/2011
CN  103728727 A  4/2014
(Continued)

OTHER PUBLICATIONS

First Office Action in the Chinese Patent Application No. 201710546030.6, dated Sep. 20, 2019; English translation attached.
(Continued)

*Primary Examiner* — Nan-Ying Yang
(74) *Attorney, Agent, or Firm* — Intellectual Valley Law, P.C.

(57) ABSTRACT

The present application discloses a virtual image display apparatus. The virtual image display apparatus includes a gaze monitor configured to detect a gaze direction of a user and determine a gaze point based on the gaze direction; a display device configured to output an image; a projection lens configured to project the image onto a depth plane corresponding to the gaze point; and a controller configured to control a focal length of the projection lens based on a change of the gaze point.

16 Claims, 11 Drawing Sheets

(51) Int. Cl.
  *B60K 35/00* (2006.01)
  *G02B 27/00* (2006.01)
(52) U.S. Cl.
  CPC .... *G02B 27/0101* (2013.01); *B60K 2370/149* (2019.05); *B60K 2370/1529* (2019.05); *G02B 2027/014* (2013.01); *G02B 2027/0187* (2013.01)

(56) References Cited

U.S. PATENT DOCUMENTS

| | | | |
|---|---|---|---|
| 2010/0020170 A1* | 1/2010 | Higgins-Luthman | ......................... B60Q 1/143 348/135 |
| 2011/0227717 A1 | 9/2011 | Kumon | |
| 2015/0010207 A1 | 1/2015 | Inada et al. | |
| 2016/0148343 A1* | 5/2016 | Yan | ............ G06T 7/11 345/660 |
| 2017/0160518 A1* | 6/2017 | Lanman | ................. G02B 7/287 |
| 2017/0336638 A1* | 11/2017 | Bos | ................... G02B 27/0172 |
| 2017/0351093 A1 | 12/2017 | Ling et al. | |

FOREIGN PATENT DOCUMENTS

| | | |
|---|---|---|
| CN | 104169993 A | 11/2014 |
| CN | 104932104 A | 9/2015 |
| CN | 105785569 A | 7/2016 |
| JP | 11119147 A | 4/1999 |
| JP | 2005313772 A | 11/2005 |

OTHER PUBLICATIONS

International Search Report & Written Opinion dated Mar. 28, 2018, regarding PCT/CN2017/115076.

* cited by examiner

VIRTUAL IMAGE DISPLAY APPARATUS, VEHICLE COMPRISING HEAD-UP DISPLAY APPARATUS COMPRISING VIRTUAL IMAGE DISPLAY APPARATUS, AND METHOD FOR VIRTUAL IMAGE DISPLAY

CROSS-REFERENCE TO RELATED APPLICATION

This application is a national stage application under 35 U.S.C. § 371 of International Application No. PCT/CN2017/115076, filed Dec. 7, 2017, which claims priority to Chinese Patent Application No. 201710546030.6, filed Jul. 6, 2017, the contents of which are incorporated by reference in the entirety.

TECHNICAL FIELD

The present invention relates to display technology, more particularly, to a virtual image display apparatus, a vehicle having a head-up display apparatus including a virtual image display apparatus, and a method for virtual image display.

BACKGROUND

A virtual image display apparatuses such as ahead-up display apparatus has found many applications. For example, the head-up display apparatus has been used in motor vehicles for display driving-related information. This makes it easier for a driver to monitor various important driving parameters. In some cases, the head-up display apparatus projects the image onto the windshield, e.g., in a lower region of the driver's field of view. The driver need not divert gaze entirely away from the road in order to perceive the information items presented by a head-up display, but can merely direct his or her gaze slightly downward in order to view the information presented on the head-up display.

SUMMARY

In one aspect, the present invention provides a virtual image display apparatus, comprising a gaze monitor configured to detect a gaze direction of a user and determine a gaze point based on the gaze direction; a display device configured to output an image; a projection lens configured to project the image onto a depth plane corresponding to the gaze point; and a controller configured to control a focal length of the projection lens based on a change of the gaze point.

Optionally, the projection lens is configured to project the image onto a first depth plane corresponding to a first gaze point; and the controller is configured to control the focal length of the projection lens based on the change of the gaze point from the first gaze point to a second gaze point so that the projection lens is configured to project the image onto an adjusted depth plane based on the focal length being adjusted.

Optionally, a depth of a second depth plane corresponding to the second gaze point is equal to or less than a threshold depth; and the adjusted depth plane is the second depth plane corresponding to the second gaze point.

Optionally, a depth of a second depth plane corresponding to the second gaze point is greater than a threshold depth; and the adjusted depth plane is a depth plane having a fixed depth greater than the threshold depth.

Optionally, the virtual image display apparatus further comprises an image renderer configured to generate a rendered image based on the image output from the display device; and the projection lens is configured to project the rendered image onto the second depth plane.

Optionally, the controller is configured to turn off the display device based on a change of the gaze point from the first gaze point to a second gaze point; and the second gaze point is outside a display zone of the virtual image display apparatus.

Optionally, the gaze monitor comprises an imaging device configured to track a first gaze direction and a second gaze direction in real time; and a processor configured to determine a first intersection point between a reference plane and the first gaze direction of a first view zone, a second intersection point between the reference plane and the second gaze direction of a second view zone, and a distance between the first intersecting point and the second intersecting point; and determine a distance between the depth plane corresponding to the gaze point and a plane containing the first view zone and the second view zone based on the distance between the first intersecting point and the second intersecting point, a distance between the reference plane and the plane containing the first view zone and the second view zone, and a distance between the first view zone and the second view zone.

Optionally, the distance between the depth plane corresponding to the gaze point and the plane containing the first view zone and the second view zone is determined according to a following equation:

$$L = \frac{P*D}{P-R};$$

wherein L stands for the distance between the depth plane corresponding to the gaze point and the plane containing the first view zone and the second view zone, P stands for the distance between the first view zone and the second view zone, D stands for the distance between the reference plane and the plane containing the first view zone and the second view zone, and R stands for the distance between the first intersecting point and the second intersecting point.

Optionally, a focal length of the projection lens is determined according to a following equation:

$$f = \frac{N*(L-L0)}{L-L0-N};$$

wherein f stands for the focal length of the projection lens, L stands for a distance between the depth plane corresponding to the gaze point and a plane containing a first view zone and a second view zone, L0 stands for a distance between the projection lens and the plane containing the first view zone and the second view zone, N stands for a distance between the display device and the projection lens; wherein the controller is configured to adjust a focal length of the projection lens by controlling one or any combination of N, L0, and L.

Optionally, the controller comprises an actuator configured to adjust the focal length of the projection lens; and a data detector configured to detect a data comprising the distance between the depth plane corresponding to the gaze point and the plane containing the first view zone and the second view zone, the distance between the projection lens and the plane containing the first view zone and the second view zone, and the distance between the display device and the projection lens.

In another aspect, the present invention provides a vehicle comprising a head-up display apparatus comprising the virtual image display apparatus described herein.

In another aspect, the present invention provides a method for virtual image display, comprising detecting a gaze direction; determining a gaze point based on the gaze direction; outputting an image by a display device; projecting the image onto a depth plane corresponding to the gaze point; and controlling a focal length of a projection lens based on a change of the gaze point.

Optionally, the method further comprises projecting the image by the projection lens onto a first depth plane corresponding to a first gaze point; detecting the change of the gaze point from the first gaze point to a second gaze point; adjusting the focal length of the projection lens based on the change of the gaze point; and projecting the image onto an adjusted depth plane based on the focal length being adjusted.

Optionally, the method further comprises comparing a depth of a second depth plane corresponding to the second gaze point with a threshold depth, and determining the focal length based on a result of comparing.

Optionally, the depth of the second depth plane is equal to or less than the threshold depth, and the adjusted depth plane is the second depth plane.

Optionally, the depth of the second depth plane is greater than the threshold depth, and the adjusted depth plane is a depth plane having a fixed depth greater than the threshold depth.

Optionally, the method further comprises generating a rendered image based on the image output from the display device; wherein projecting the image onto the second depth plane comprises projecting the rendered image onto the second depth plane.

Optionally, the method further comprises determining whether the second gaze point is outside a display zone of the virtual image display apparatus; and turning off the display device based on a determination that the second gaze point is outside the display zone.

Optionally, detecting the gaze direction comprises tracking a first gaze direction and a second gaze direction in real time; the method further comprises determining a first intersection point between a reference plane and the first gaze direction of a first view zone, a second intersection point between the reference plane and the second gaze direction of a second view zone, and a distance between the first intersecting point and the second intersecting point; and determining a distance between the depth plane corresponding to the gaze point and a plane containing the first view zone and the second view zone based on the distance between the first intersecting point and the second intersecting point, a distance between the reference plane and the plane containing the first view zone and the second view zone, and a distance between the first view zone and the second view zone.

Optionally, determining the distance between the depth plane corresponding to the gaze point and the plane containing the first view zone and the second view zone is performed according to a following equation:

$$L = \frac{P * D}{P - R};$$

wherein L stands for the distance between the depth plane corresponding to the gaze point and the plane containing the first view zone and the second view zone, P stands for the distance between the first view zone and the second view zone, D stands for the distance between the reference plane and the plane containing the first view zone and the second view zone, and R stands for the distance between the first intersecting point and the second intersecting point.

Optionally, the focal length of the projection lens is determined according to a following equation:

$$f = \frac{N * (L - L0)}{L - L0 - N};$$

wherein f stands for the focal length of the projection lens, L stands for a distance between the depth plane corresponding to the gaze point and a plane containing a first view zone and a second view zone, L0 stands for a distance between the projection lens and the plane containing the first view zone and the second view zone, N stands for a distance between the display device and the projection lens; wherein controlling the focal length of the projection lens is performed by controlling one or any combination of N, L0, and L.

Optionally, the method further comprises detecting a data comprising the distance between the depth plane corresponding to the gaze point and the plane containing the first view zone and the second view zone, the distance between the projection lens and the plane containing the first view zone and the second view zone, and the distance between the display device and the projection lens.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Virtual image display apparatuses have found a wide range of applications. For example, head-up display has been used in vehicles for displaying driving-related information on a windshield of the vehicle. By having a head-up display, the driver can conveniently view the driving-related information without looking away from the road ahead, e.g., without looking at the center console or dashboard of the vehicle. In conventional head-up display, the driving-related information is typically display on a depth plane having a fixed and non-adjustable depth, e.g., a depth of approximately 2 meters. The image displayed by the conventional head-up display apparatus has a non-adjustable image size. When the gaze point of the driver is not on the fixed depth plane, the driver's eye has to re-focus in order to clearly view the displayed image on the fixed depth plane. This re-focusing process distracts the driver from driving the vehicle, affecting driving safety. Moreover, the display device in the conventional head-up display is required to be always turned on, resulting in waster of energy and loss of life time of the display device.

Accordingly, the present disclosure provides, inter alia, a virtual image display apparatus, a vehicle having a head-up display apparatus including a virtual image display apparatus, and a method for virtual image display that substantially obviate one or more of the problems due to limitations and disadvantages of the related art. In one aspect, the present disclosure provides a virtual image display apparatus. In some embodiments, the virtual image display apparatus includes a gaze monitor configured to detect a gaze direction of a user and determine a gaze point based on the gaze direction; a display device configured to output an image; a projection lens configured to project the image onto a depth plane corresponding to the gaze point; and a controller configured to control a focal length of the projection lens based on a change of the gaze point.

Figure 1:
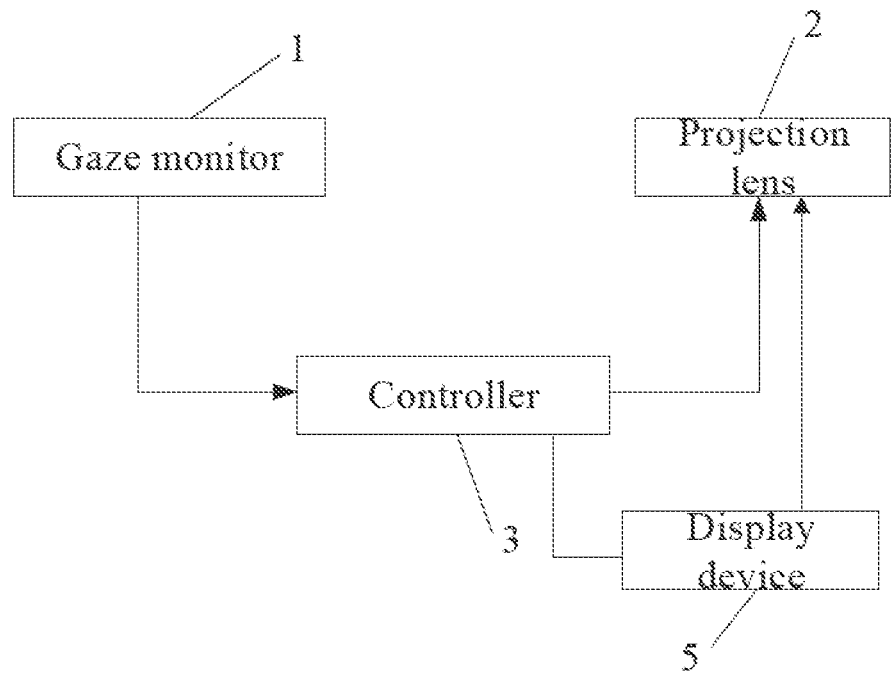
FIG. 1 is a schematic diagram illustrating the structure of a virtual image display apparatus in some embodiments according to the present disclosure.

FIG. 1 is a schematic diagram illustrating the structure of a virtual image display apparatus in some embodiments according to the present disclosure. Referring to FIG. 1, the virtual image display apparatus in some embodiments includes a gaze monitor 1, a projection lens 2, a controller 3, and a display device 5. In some embodiments, the gaze monitor 1 detects gaze direction of an observer (e.g., a driver of a vehicle) and determines a gaze point based on the detected gaze direction. Optionally, the gaze monitor 1 detects a plurality of gaze directions (e.g., a first gaze direction and a second gaze direction) respectively for a plurality of view zones (e.g., a first view zone corresponding to a left eye of the user and a second view zone corresponding to a right eye of the user). Moreover, the gaze monitor 1 in some embodiments calculates a distance between a plane containing the plurality of view zones and a depth plane corresponding to the gaze point. Optionally, the gaze monitor 1 is coupled to the controller 5.

Figure 2:
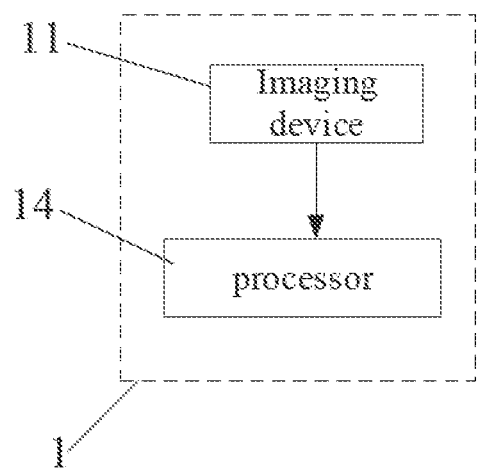
FIG. 2 is a schematic diagram illustrating the structure of a gaze monitor in some embodiments according to the present disclosure.

In some embodiments, the gaze monitor 1 includes an imaging device. FIG. 2 is a schematic diagram illustrating the structure of a gaze monitor in some embodiments according to the present disclosure. Referring to FIG. 2, the gaze monitor 1 in some embodiments includes an imaging device 11 coupled to a processor 14. In some embodiments, the imaging device is configured to track a first gaze direction and a second gaze direction in real time.

Figure 3:
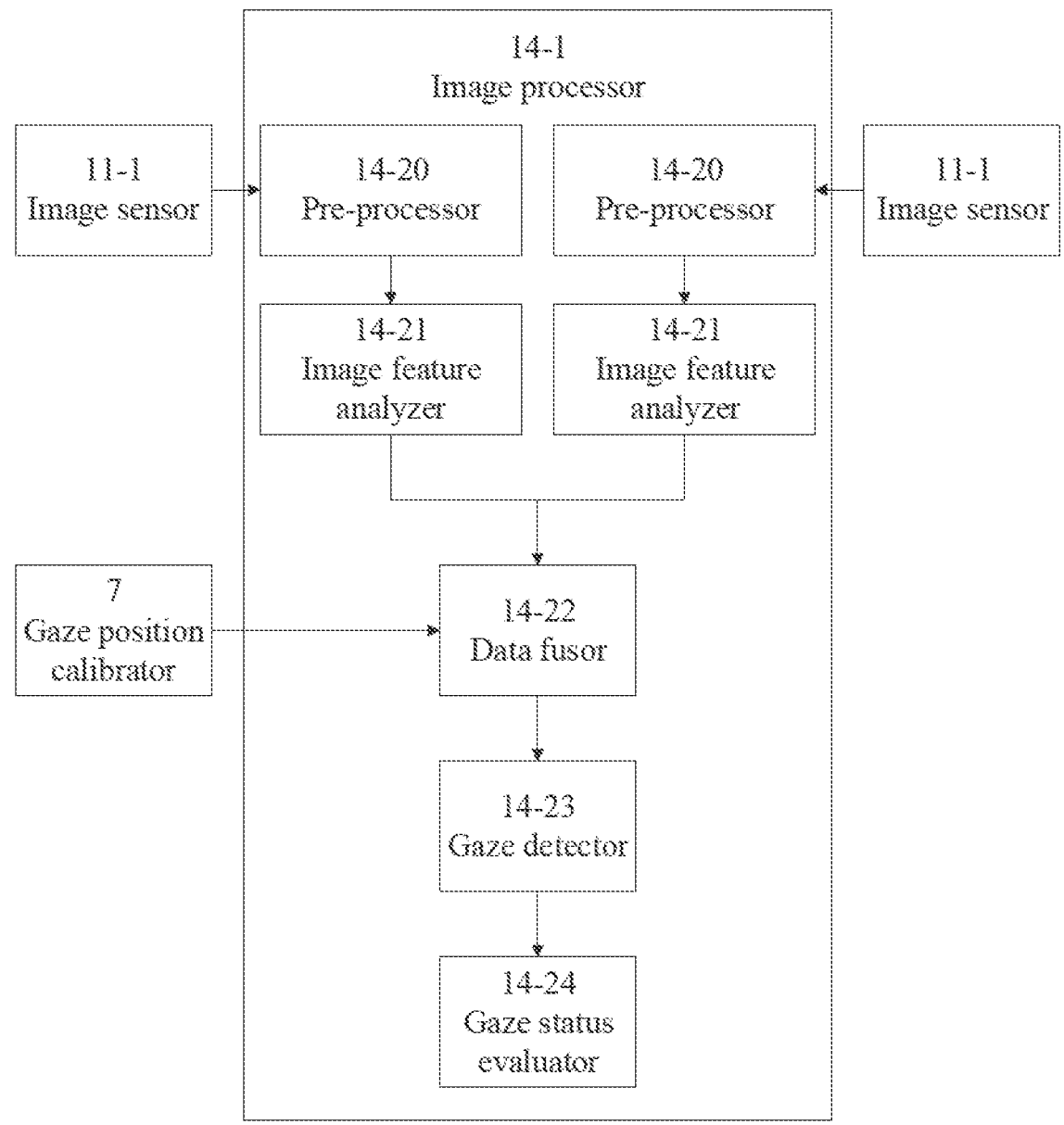
FIG. 3 is a schematic diagram illustrating the structure of an image processor in some embodiments according to the present disclosure.

Various appropriate gaze monitors may be used to track the gaze direction. FIG. 3 is a schematic diagram illustrating the structure of an image processor in some embodiments according to the present disclosure. Referring to FIG. 3, in some embodiments, the image device 11 includes a plurality of image sensors 11-1, and the processor 14 includes an image processor 14-1 coupled to the plurality of image sensors. The image processor 14-1 in some embodiments includes a plurality of image feature analyzers 14-21. Each of the plurality of image feature analyzers 14-21 corresponds to one of the plurality of image sensors 11-1, and is configured to analyze the images captured by one of the plurality of image sensors 11-1. Optionally, the image processor 14-1 further includes a plurality of pre-processors 14-20 configured to pre-processing the plurality of images captured by one of the plurality of image sensors 11-1. For example, the images may be subject to one or more of smooth filtering and binary processing by the plurality of the pre-processors 14-20 before they are analyzed by the plurality of image feature analyzers 14-21.

In some embodiments, each of the plurality of image feature analyzers 14-21 is configured to identify an eye region containing the user's eye in one of the plurality of images; detect the plurality of glints in the eye region; calculate a center of the pupil of the user; and determine the relative positional relationship between the center of the pupil of the user and the plurality of glints. The plurality of image feature analyzers 14-21 determine a plurality of relative positional relationships between the center of the pupil of the user and the plurality of glints, respectively from a plurality of eye regions in the plurality of images of the user's face.

Various appropriate algorithms may be used for detecting and recognizing an eye region containing the user's eye in the image captured by the image sensor 11-1. In some embodiments, each of the plurality of image feature analyzers 14-21 is configured to select the eye region based on reference eye models. Optionally, the reference eye models are pre-trained reference eye models. Optionally, the pre-trained reference eye models are pre-trained using a machine-learning algorithm. Examples of appropriate algorithms for training the reference eye models include, but are not limited to, an Δdaboost algorithm, a support vector machine algorithm (linear or non-linear), and a neural network algorithm.

In some embodiments, the image feature analyzer 14-21 is configured to identify an eye region containing the user's eye in an image captured by an image sensor. Once the eye region is identified, the image feature analyzer is configured to calculate a histogram of the eye region, derive a glint threshold value based on the relationship between peaks and valleys of the histogram, and obtain mass centers of the plurality of glints in the eye region, e.g., by a binary processing method, thereby detecting the plurality of glints in the eye region. The image feature analyzer is then configured to search for a boundary of the pupil in proximity of the plurality of glints. Once the boundary of the pupil is determined, various pupil parameters, e.g., the center of the pupil, can be derived, e.g., using an ellipse fitting method. A relative positional relationship between the pupil and the plurality of glints (e.g., a relative positional relationship between the center of the pupil and mass centers of the plurality of glints) can be determined based on the pupil parameters and the positions of the plurality of glints.

Figure 4:
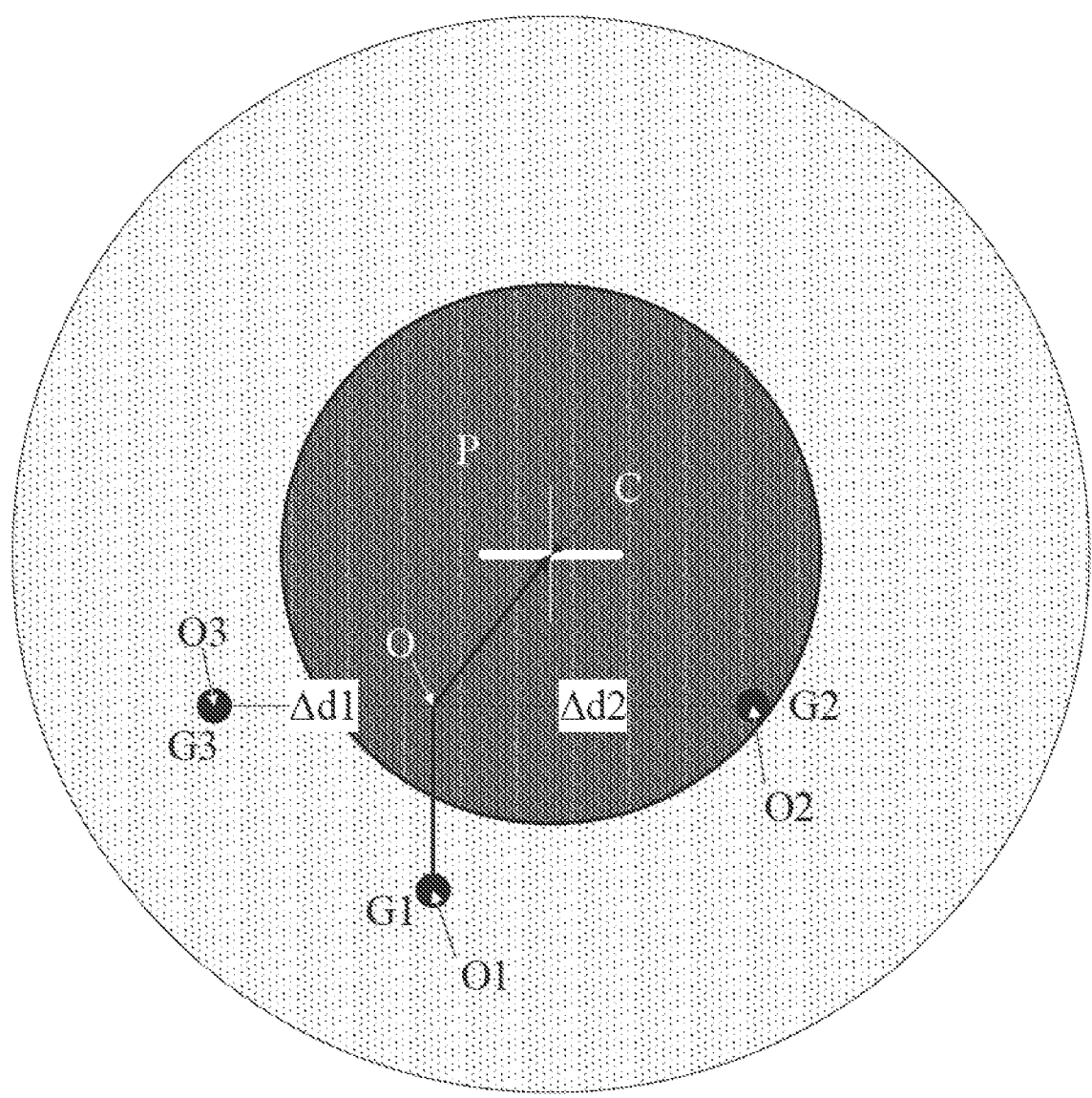
FIG. 4 is a schematic diagram illustrating a relative positional relationship between the center of a pupil and a plurality of glints in some embodiments according to the present disclosure.

FIG. 4 is a schematic diagram illustrating a relative positional relationship between the center of a pupil and a plurality of glints in some embodiments according to the present disclosure. Referring to FIG. 4, the eye region has three glints G1, G2, and G3, the mass centers of which are denoted as O1, O2, and O3, respectively. The center of the pupil P is denoted as C. FIG. 4 also shows a reference point O, which is located in a line connecting O2 and O3. Moreover, a line connecting O1 and O is normal to the line connecting O2 and O3. A distance between O and O3 is denoted a Δd1, and a distance between O and O2 is denoted as Δd2. The relative positional relationship between the center C of the pupil P and the plurality of glints G1, G2, and G3 can be expressed as a relative deviation.

Referring to FIG. 3, the image processor 14-1 in some embodiments further includes a data fusor 14-22 configured to fuse relative deviations from a plurality of eye regions in the plurality of images of the user's face (e.g., captured by the plurality of image sensors 1). Optionally, a combined relative deviation Δd is determined according to the following equation:

$$\Delta d = (w1 * \Delta dl) + (w2 * \Delta dr) \quad (1);$$

wherein Δdl is the relative deviation in a first eye region in a first image captured by a first image sensor; Δdr is the relative deviation in a second eye region in a second image captured by a second image sensor; Δdr=(Δd1+Δd2); and w1 and w2 are weight coefficients respectively for Δd1 and Δd2.

Referring to FIG. 3, the image processor 14-1 in some embodiments further includes a gaze detector 14-23 configured to calculate the user's gaze position and gaze direction based on the plurality of relative positional relationships between the center of a pupil of the user and the plurality of glints. Optionally, the gaze position is expressed as coordinates on the image display panel or on the rear-view mirror, and the gaze detector 14-23 is configured to calculate gaze coordinates on the image display panel based on the plurality of relative positional relationships between the center of a pupil of the user and the plurality of glints. In some embodiments, the gaze detector 14-23 is configured to calculate gaze coordinates based on a plurality of calibration parameters and the plurality of relative positional relationships. The plurality of calibration parameters may be stored on a memory of the image processor 14-1 and provided to the gaze detector 14-23 for performing the calculation. Optionally, the virtual image display apparatus further includes a gaze position calibrator 7 configured to calibrate the user's gaze position and gaze direction and the plurality of relative positional relationships between the center of a pupil of the user and the plurality of glints.

Figure 5:
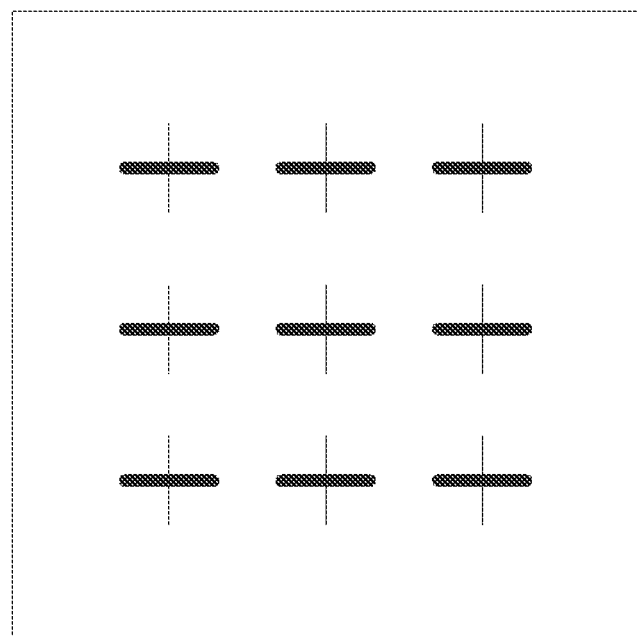
FIG. 5 is a schematic diagram illustrating a calibration image for calibrating user's gaze position and gaze direction and the plurality of relative positional relationships in some embodiments according to the present disclosure.

FIG. 5 is a schematic diagram illustrating a calibration image for calibrating user's gaze position and gaze direction and the plurality of relative positional relationships in some embodiments according to the present disclosure. Referring to FIG. 5, the image includes nine cross-points. During the calibration process, the user is to maintain his head still, and gaze each of the nine cross-points one by one. A relative positional relationship between the center of a pupil of the user and the plurality of glints is calculated each time the user is gazing a different cross-point. A correspondence between gaze positions (e.g., the coordinates on the image display panel) and the plurality of relative positional relationships can be established.

In one example, the correspondence between gaze positions (e.g., the coordinates on the image display panel) and the plurality of relative positional relationships can be expressed according to the following equation:

$$X_s = a1 + a2*dx + a3*dy + a4*dx*dy + a5*dx*dx + a6*dy*dy \quad (2);$$

$$Y_s = b1 + b2*dx + b3*dy + b4*dx*dy + b5*dx*dx + b6*dy*dy \quad (3);$$

wherein Xs and Ys are coordinates in the image display panel, dx and dy are relative deviations of a reference glint, and a1-a6 and b1-b6 are calibration parameters. A total of 18 equations may be obtained from calibration of nine cross points. The calibration parameters a1-a6 and b1-b6 can thus be obtained, e.g., by a least square method. The gaze detector can calculate gaze coordinates based on the calibration parameters and the plurality of relative positional relationships.

In some embodiments, the gaze monitor 1 tracks gaze direction based on pupil corneal reflection technique. In some embodiments, the gaze monitor 1 is a video oculography-based gaze tracking apparatus, e.g., an infrared video oculography-based gaze tracking apparatus.

Referring to FIG. 1, the display device 5 is configured to output an image, e.g., a parallax image. In some embodiments, the projection lens 2 coupled to the display device 5 is configured to project the image output from the display device 5 to a depth plane, the depth of which is determined by a focal length of the projection lens 2. Optionally, the projection lens 2 is configured to project the image onto a depth plane corresponding to a gaze point of an observer. For example, the projection lens 2 is configured to project the image onto an image projection plane. The depth plane is a plane substantially parallel to the image projection plane, and the gaze point of the observer is on the depth plane. Optionally, the depth plane and the image projection plane substantially overlap with each other. The controller 3 is coupled to the gaze monitor 1 and the projection lens 2, and is configured to control a focal length of the projection lens 2 based on a change of the gaze point.

In some embodiments, at the first time point, the projection lens 2 is configured to project the image onto a first depth plane corresponding to a first gaze point. At a second time point, a change of gaze point occurs. The controller 3 is configured to control the focal length of the projection lens 2 based on a change of the gaze point so that the projection lens is configured to project the image onto an adjusted depth plane based on the focal length being adjusted. In the present virtual image display apparatus, the focal length of the projection lens 2 automatically undergoes a change to project the image onto a depth plane in response to a change of gaze point of the observer. The observer need not switch his head position in order to clearly view the contents of the virtual image display. The present apparatus significantly enhances the convenience and safety of using the virtual image display apparatus, e.g., particularly when the virtual image display apparatus is used as a part of a head-up display of a vehicle.

In some embodiments, the adjusted depth plane is a second depth plane corresponding to the second gaze point. Optionally, at the first time point, the projection lens 2 is configured to project the image onto a first depth plane corresponding to a first gaze point. At a second time point, the gaze point of the user changes from the first gaze point to a second gaze point. The controller 3 is configured to control the focal length of the projection lens 2 based on a change of the gaze point from the first gaze point to a second gaze point so that the projection lens is configured to project the image onto a second depth plane corresponding to the second gaze point.

In some embodiments, the adjusted depth plane is a depth plane different from the second depth plane corresponding to the second gaze point. Optionally, at the first time point, the projection lens 2 is configured to project the image onto a first depth plane corresponding to a first gaze point. At a second time point, the gaze point of the user changes from the first gaze point to a second gaze point. The controller 3 is configured to control the focal length of the projection lens 2 based on a change of the gaze point from the first gaze point to a second gaze point so that the projection lens is configured to project the image onto the adjusted depth plane. Optionally, the adjusted depth plane is not a depth plane corresponding to the second gaze point.

Figure 6:
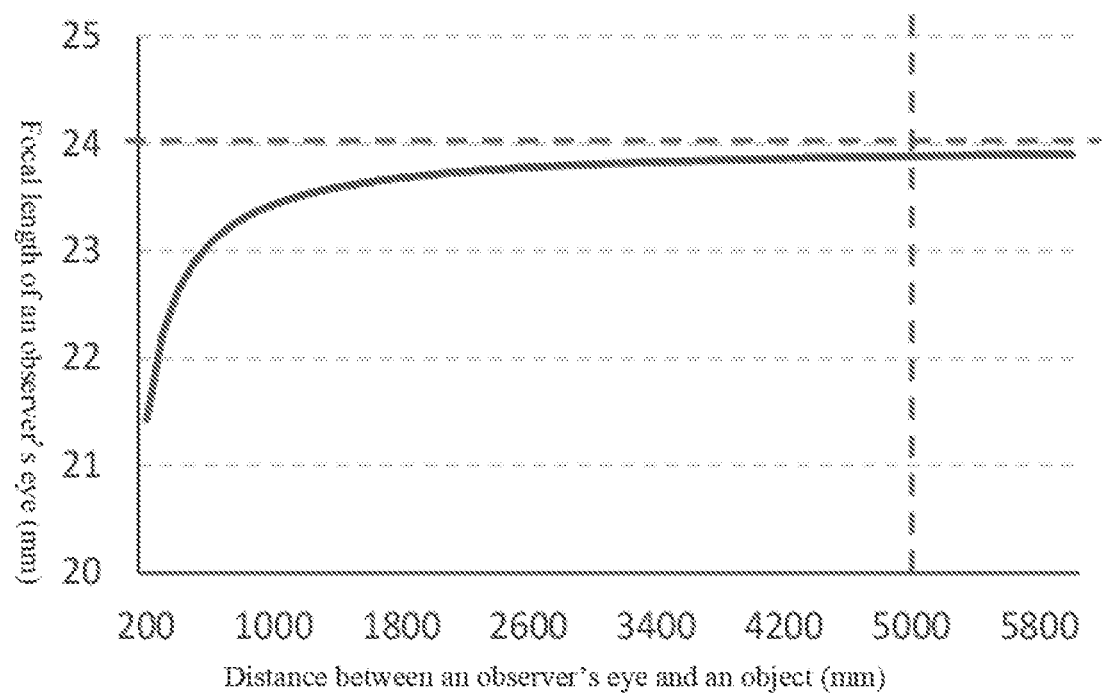
FIG. 6 depicts the correlation between a focal length of an observer's eye and a distance between an observer's eye and an object.

For example, the second depth plane corresponding to the second gaze point in some embodiments has a depth greater than a threshold depth. In this case, the adjusted depth plane need not be a depth plane corresponding to the second gaze point. Optionally, when a depth plane corresponding to the second gaze point has a depth greater than a threshold depth, the focal length of the projection lens is maintained substantially unchanged at a fixed value. FIG. 6 depicts the correlation between a focal length of an observer's eye and a distance between an observer's eye and an object. For an average adult's eye, a distance between the retina and the lens of the eye is approximately 24 mm. When a distance between an observer's eye and an object to be observed changes, the focal length of the observer's eye (e.g., the focal length of the lens of the observer's eye) undergoes a change in order for a clear image to form on the retina. Referring to FIG. 6, when the distance between the observer's eye and the object to be observed increases, the focal length of the observer's eye increases correspondingly. When the distance between the observer's eye and the object to be observed is greater than a threshold distance, the focal length of the observer's eye undergoes only a very small change, e.g., barely changes. Thus, when the distance between the observer's eye and the object to be observed is greater than the threshold distance, the lens of the observer's eye substantially does not undergo a re-focusing process, and a physiological delay is not produced in the observer's eye. Based on this principle, when distance between the observer's eye and the object to be observed is greater than the threshold distance, it is beneficial not to change the focal length of the projection lens based on a change in the gaze point, e.g., for the safety of the driver viewing a head-up display. For example, when a depth plane corresponding to the second gaze point has a depth greater than a threshold depth, the adjusted depth plane can be a depth plane having a fixed depth greater than the threshold depth. As shown in FIG. 5, when the distance between the observer's eye and the object to be observed is greater than 5 meters, the lens of the observer's eye substantially does not undergo a re-focusing process. Accordingly, in one example, when a depth plane corresponding to the second gaze point has a depth greater than 5 meters, the adjusted depth plane can be a depth plane having a fixed depth greater than the threshold depth. Optionally, the fixed depth has less than a threshold value such that the viewing error is below a threshold value. In one example, the fixed depth is 25 meters. In another example, the fixed depth is 30 meters.

Figure 7:
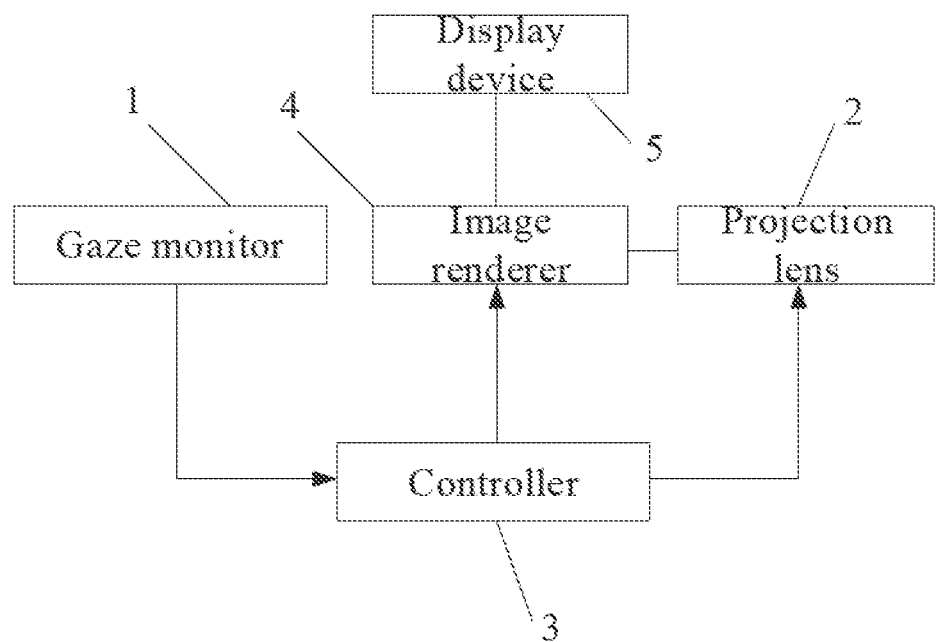
FIG. 7 is a schematic diagram illustrating the structure of a virtual image display apparatus in some embodiments according to the present disclosure.

FIG. 7 is a schematic diagram illustrating the structure of a virtual image display apparatus in some embodiments according to the present disclosure. Referring to FIG. 7, the virtual image display apparatus in some embodiments further includes an image renderer 4 configured to generate a rendered image based on the image output from the display device 5. The display device 5 is configured to output an image, e.g., a parallax image. In some embodiments, the projection lens 2 coupled to the display device 5 through the image renderer 4 and is configured to project the rendered image output from the image renderer to a depth plane. Optionally, the projection lens 2 is configured to project the rendered image onto a depth plane corresponding to a gaze point of an observer. Optionally, the projection lens 2 is configured to project the rendered image onto the adjusted depth plane discussed above. In one example, the rendered image is projected onto a depth plane having a fixed depth as discussed above. Optionally, the image renderer is configured to enhance the clarity of the image projected onto the adjusted depth plane. Optionally, the image renderer is configured to adjust the size of the image projected onto the adjusted depth plane.

In some embodiments, the image renderer is configured to prepare three-dimensional geometric model information, three-dimensional animation definition information and material information. Optionally, the three-dimensional geometric model information is obtained through one or a combination of three-dimensional scanning, three-dimensional interactive geometric modeling, and using a three-dimensional model library.

Optionally, the three-dimensional animation definition information is obtained through one or a combination of motion design, motion capture, motion calculation, and dynamic deformation techniques. Optionally, the material information is obtained from scanned photographs, computerized images, and images drawn by human. Optionally, the image renderer is configured to render an image by one or a combination of geometric transformation, projection transformation, perspective transformation, and window cropping, as well as the obtained material information and lighting information, thereby generating a rendered image. When the rendered image is generated, the rendered image is output to the projection lens for display.

In some embodiments, the virtual image display apparatus is a component of a head-up display apparatus in a vehicle. Optionally, the display device 5 is a display device in the vehicle. Optionally, the display device 5 is configured to display driving information displayed on the center console or dashboard of the vehicle, e.g., speed information and GPS information. The projection lens 2 is configured to project the driving information onto a depth plane (e.g., a depth plane corresponding to a gaze point or a depth plane having a fixed depth). In a vehicle having the present virtual image display apparatus, the focal length of the projection lens 2 automatically undergoes a change to project the image onto a depth plane in response to a change of gaze point of the observer. The observer need not switch his head position in order to clearly view the contents of the virtual image display. The present apparatus significantly enhances the convenience and safety of using the virtual image display apparatus, e.g., particularly when the virtual image display apparatus is used as a part of a head-up display of a vehicle.

In some embodiments, the projection lens 2 is configured to project the image onto a first depth plane corresponding to a first gaze point, and the controller 3 is configured to turn off the display device 5 based on a change of the gaze direction from the first gaze direction to a second gaze direction, and the second gaze point is outside a display zone of the virtual image display apparatus. Optionally, the display zone is a zone defined by a range of gaze directions. Optionally, the display zone is a zone in which the gaze direction is no more than a threshold degree of angle away from a reference gaze direction. In one example, the display zone is a zone in which the gaze direction is no more than 30-degree angle away from the reference gaze direction. Optionally, the controller 3 is configured to turn on the display device 5 based on a change of the gaze direction from the second gaze direction to a third gaze direction corresponding to a third gaze point, the second gaze point being outside the display zone and the third gaze point being inside the display zone.

In some embodiments, once the gaze point is changed back inside the display zone, and the display device 5 is turned on, the gaze monitor 1 is configured to determine the gaze point of the observer. Optionally, when the depth plane corresponding to the gaze point has a depth greater than a threshold depth, the projection lens 2 is configured to project the image onto the adjusted depth plane having a fixed depth greater than the threshold depth. Optionally, when the depth plane corresponding to the gaze point has a depth equal to or less than a threshold depth, the projection lens 2 is configured to project the image onto a depth plane corresponding to the gaze point. Optionally, the controller 3 is configured to control the focal length of the projection lens 2 based on a change of the gaze point from the first gaze point to a second gaze point so that the projection lens 2 is configured to project the image onto a second depth plane corresponding to the second gaze point, as discussed above.

By having the virtual image display apparatus turning off the display device 5 when the gaze point is outside the display zone and turning on the display device 5 when the gaze pint is inside the display zone, the virtual image display apparatus can be made more energy efficient, and the life time of the display device 5 can be much extended.

Figure 8:
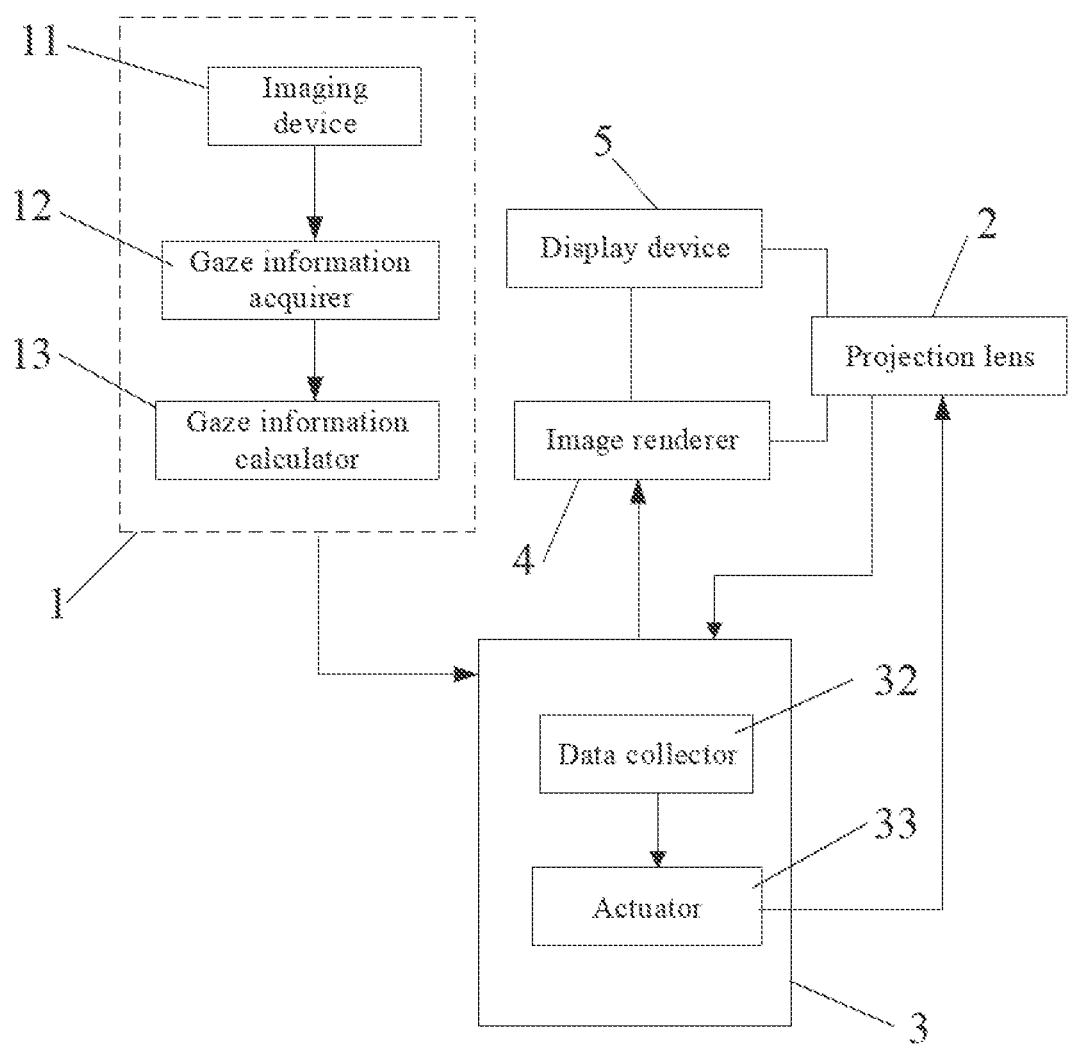
FIG. 8 is a schematic diagram illustrating the structure of a virtual image display apparatus in some embodiments according to the present disclosure.
Figure 9:
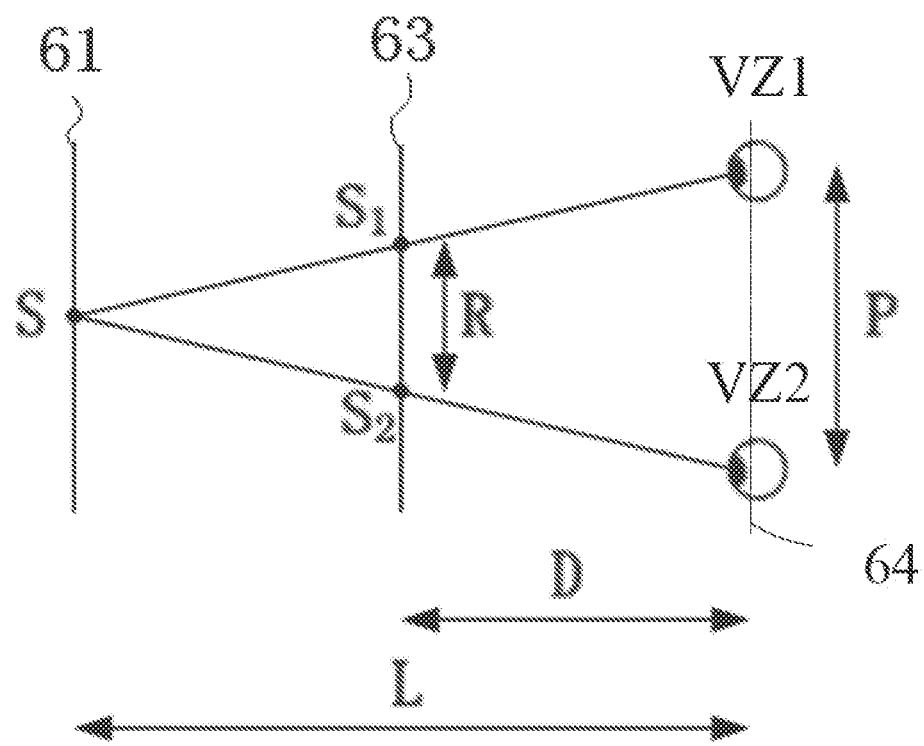
FIG. 9 is a schematic diagram illustrating a light path in a virtual image display apparatus in some embodiments according to the present disclosure.

FIG. 8 is a schematic diagram illustrating the structure of a virtual image display apparatus in some embodiments according to the present disclosure. FIG. 9 is a schematic diagram illustrating a light path in a virtual image display apparatus in some embodiments according to the present disclosure. Referring to FIG. 8 and FIG. 9, the virtual image display apparatus in some embodiments includes an imaging device 11 configured to track a first gaze direction and a second gaze direction in real time; and a gaze information acquirer 12 configured to determine a first intersection point S1 between a reference plane 63 and the first gaze direction of a first view zone VZ1 (e.g., a right eye), a second intersection point S2 between the reference plane 63 and the second gaze direction of a second view zone VZ2 (e.g., a left eye), and a distance R between the first intersection point S1 and the second intersection point S2 on the reference plane 63. Optionally, the gaze information acquirer 12 is further configured to determine a distance between the reference plane 63 and a plane 64 containing the first view zone VZ1 and the second view zone VZ2, and a distance P between the first view zone VZ1 and the second view zone VZ2. Optionally, the first view zone VZ1 and the second view zone VZ2 are two eyes of a human, and the distance P between the first view zone VZ1 and the second view zone VZ2 is an inter-pupillary distance of the human. The virtual image display apparatus in some embodiments further includes a gaze information calculator 13 configured to determine a distance L between the depth plane 61 corresponding to the gaze point S and the plane 64 containing the first view zone VZ1 and the second view zone VZ2 based on the distance R between the first intersecting point S1 and the second intersecting point S2, the distance D between the reference plane 63 and the plane 64 containing the first view zone VZ1 and the second view zone VZ2, and the distance P between the first view zone VZ1 and the second view zone VZ2.

In some embodiments, the distance L between the depth plane 61 corresponding to the gaze point S and the plane 64 containing the first view zone VZ1 and the second view zone VZ2 is determined according to the equation (1):

$$L = \frac{P*D}{P-R}; \qquad (1)$$

wherein L stands for the distance between the depth plane 61 corresponding to the gaze point S and the plane 64 containing the first view zone VZ1 and the second view zone VZ2, P stands for the distance between the first view zone VZ1 and the second view zone VZ2, D stands for the distance between the reference plane 63 and the plane 64 containing the first view zone VZ1 and the second view zone VZ2, and R stands for the distance between the first intersecting point S1 and the second intersecting point S2.

Figure 10:
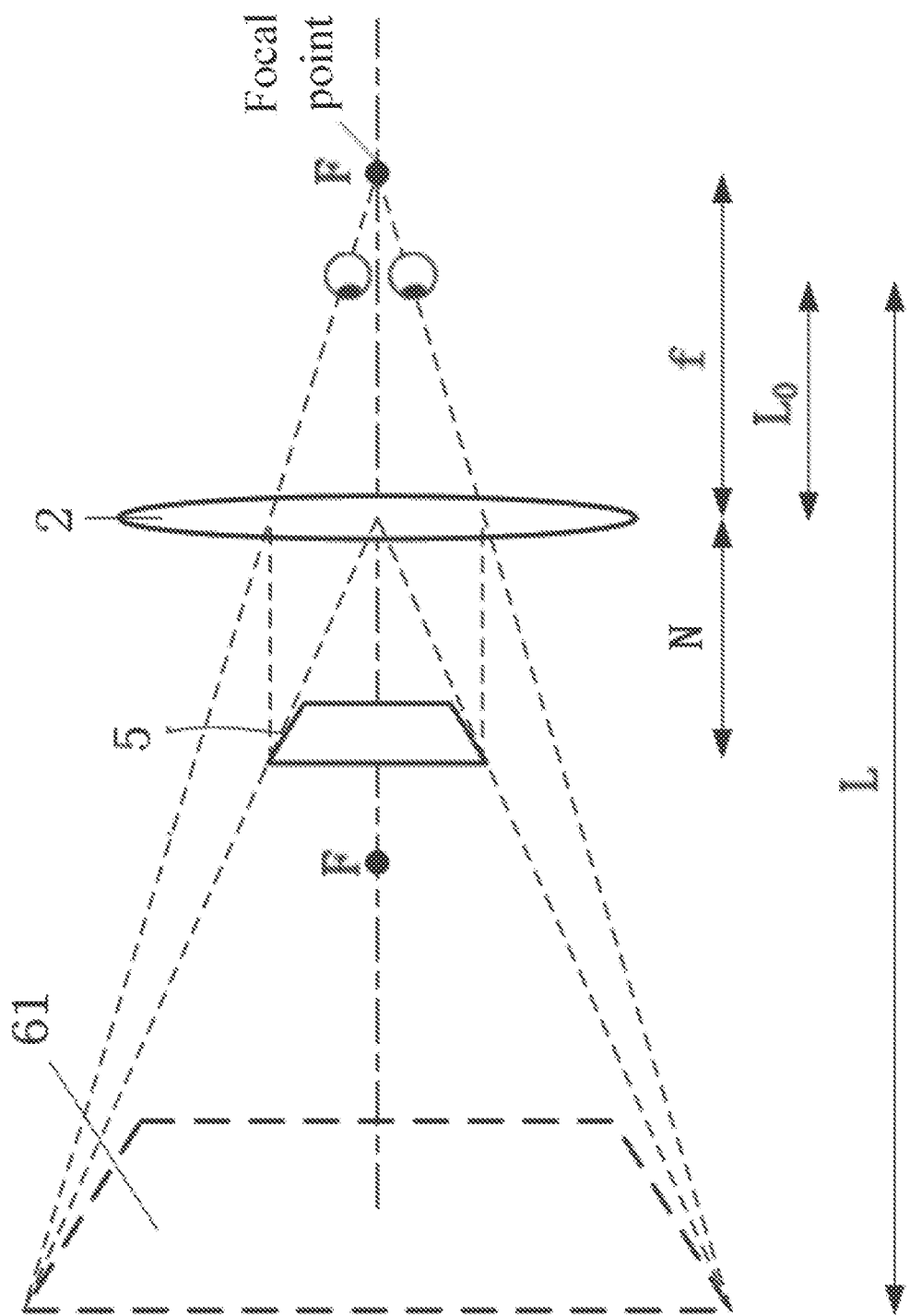
FIG. 10 is a schematic diagram illustrating a light path in a virtual image display apparatus in some embodiments according to the present disclosure.

FIG. 10 is a schematic diagram illustrating alight path in a virtual image display apparatus in some embodiments according to the present disclosure. Referring to FIG. 8, FIG. 9, and FIG. 10, the controller 3 in some embodiments includes a data detector 32 configured to detect a data including one or a combination of the distance L between the depth plane 61 corresponding to the gaze point S and the plane 64 containing the first view zone VZ1 and the second view zone VZ2, a distance L0 between the projection lens 2 and the plane 64 containing the first view zone VZ1 and the second view zone VZ2, and a distance N between the display device 5 and the projection lens 2. The controller 3 in some embodiments further includes an actuator 33 configured to adjust the focal length f of the projection lens 2 based on the data collected by the data detector 32.

In some embodiments, the controller 3 is configured to adjust a focal length f of the projection lens 2 according to the equation (2):

$$f = \frac{N*(L-L0)}{L-L0-N}; \qquad (2)$$

wherein f stands for the focal length of the projection lens 2, L stands for a distance between the depth plane 61 corresponding to the gaze point S and the plane 64 containing a first view zone VZ1 and a second view zone VZ2, L0 stands for a distance between the projection lens 2 and the plane 64 containing the first view zone VZ1 and the second view zone VZ2, N stands for the distance between the display device 5 and the projection lens 2. The controller 3 is configured to adjust a focal length f of the projection lens 2 by controlling one or any combination of N, L, and L0.

Various appropriate projection lenses may be used in the virtual image display apparatus. Optionally, the projection lens 2 is an optical projection lens. Optionally, the projection lens 2 is an electric projection lens. In some embodiments, the projection lens 2 is a variable focal length lens. Examples of variable focal length lens include liquid crystal lenses (e.g., electrically controllable liquid crystal lenses), liquid lenses (e.g., electrically controllable liquid lenses), and so on. In some embodiments, the focal length of the projection lens 2 can be controlled by displacement of the projection lens 2 along a light path.

In some embodiments, the display device 5 is coupled to the controller 3. Optionally, the controller 3 includes an information interface for receiving me or more driving information from a vehicle. Optionally, the controller 3 is configured to transmit the one or more driving information from the vehicle to the display device 5 for display.

In another aspect, the present disclosure provides a method for virtual image display. In some embodiments, the method includes detecting a gaze direction; determining a gaze point based on the gaze direction; outputting an image by a display device; projecting the image onto a depth plane corresponding to the gaze point; and controlling a focal length of a projection lens based on a change of the gaze point.

Figure 11:
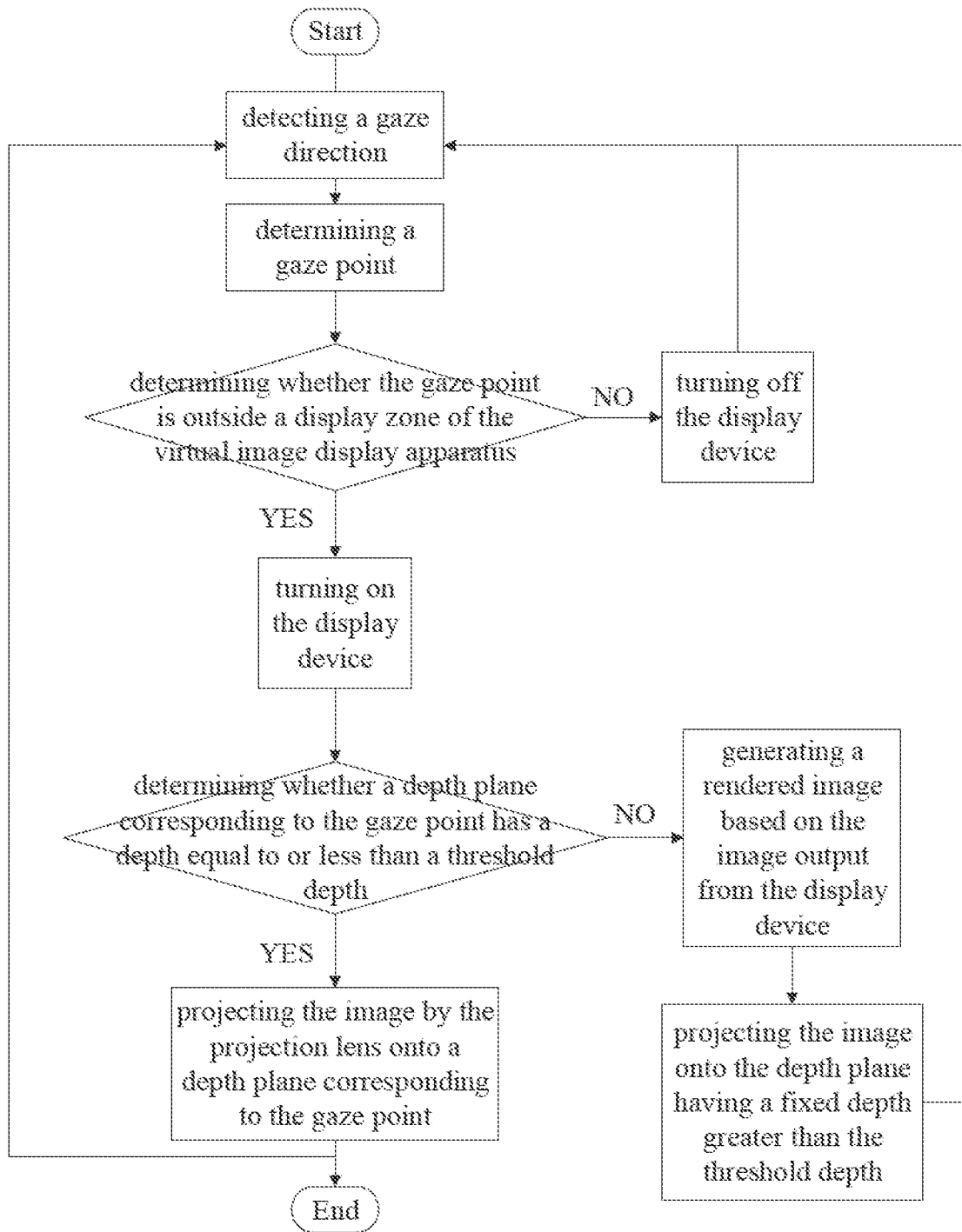
FIG. 11 is a flow chart illustrating a method for virtual image display in some embodiments according to the present disclosure.

FIG. 11 is a flow chart illustrating a method for virtual image display in some embodiments according to the present disclosure. Referring to FIG. 11, the method in some embodiments includes detecting a gaze direction, and determining a gaze point based on the gaze direction detected in the detecting step. In some embodiments, the step of detecting the gaze direction includes tracking a first gaze direction of a first view zone (e.g., a right eye of an observer) and a second gaze direction of a second view zone (e.g., a left eye of the observer) in real time.

Figure 12:
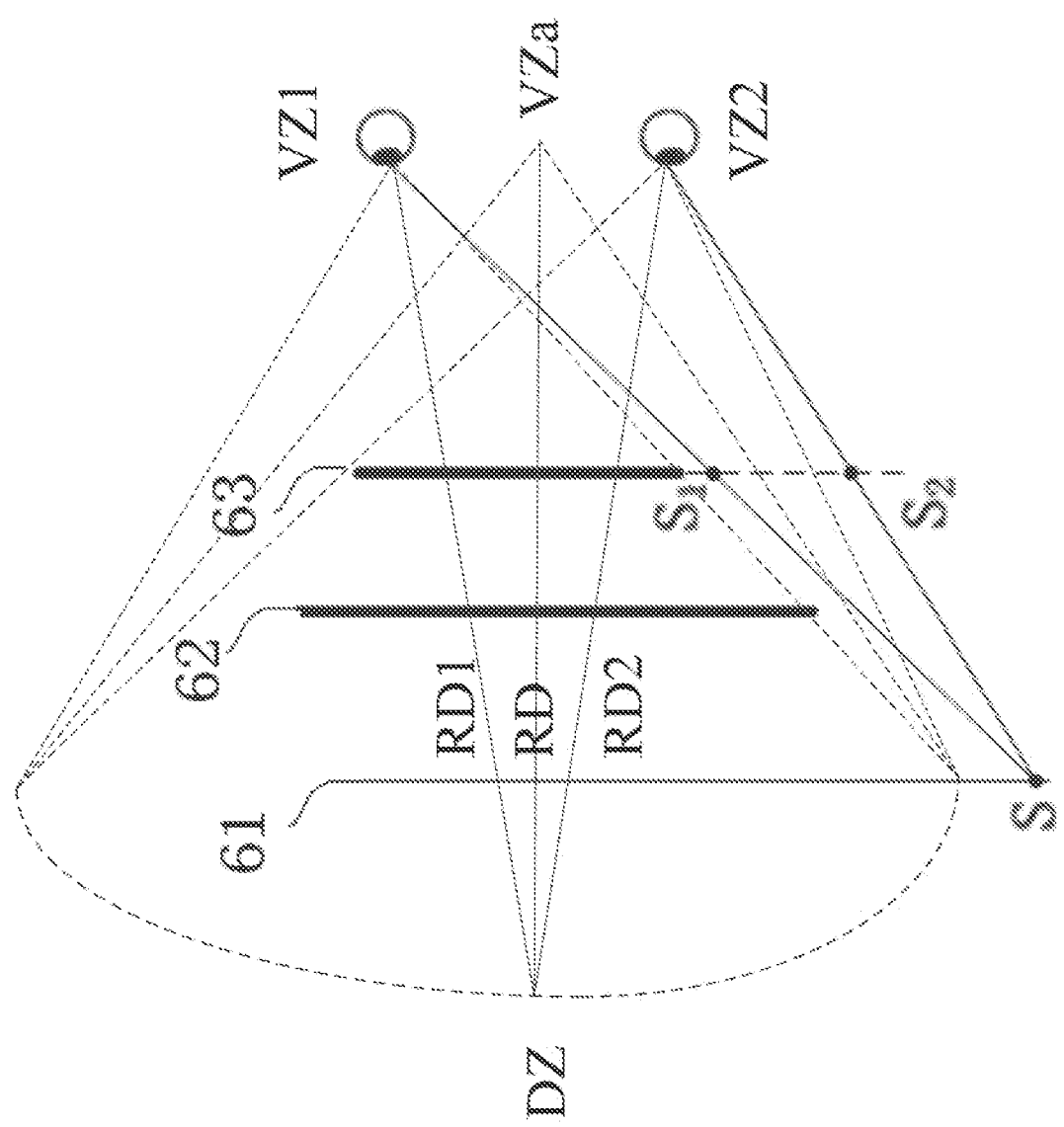
FIG. 12 illustrates a display zone in some embodiments according to the present disclosure.

Once the gaze direction detected, the method further includes determining whether the gaze point is outside a display zone of the virtual image display apparatus. Optionally, the display zone is a zone defined by a range of gaze directions. Optionally, the display zone is a zone in which the gaze direction is no more than a threshold degree of angle away from a reference gaze direction. In one example, the display zone is a zone in which the gaze direction is no more than 30-degree angle away from the reference gaze direction. FIG. 12 illustrates a display zone in some embodiments according to the present disclosure. Referring to FIG. 12, the display zone DZ is defined by a range of gaze directions. Optionally, the display zone DZ is a zone in which the gaze direction is no more than a threshold degree of angle away from a first reference gaze direction RD1 with respect to the first view zone VZ1. Optionally, the display zone DZ is a zone in which the gaze direction is no more than a threshold degree of angle away from a second reference gaze direction RD1 with respect to the second view zone VZ2. Optionally, the display zone DZ is a zone in which the gaze direction is no more than a threshold degree of angle away from a reference gaze direction RD with respect to the view zone VZa, which is a middle point between the first view zone VZ1 and the second view zone VZ2. As shown in FIG. 12, the gaze point S is outside the display zone DZ. A first gaze direction with respect to the first view zone VZ1 is depicted as the line connecting the gaze point S and a first intersection point S1, the first gaze direction is outside the display zone DZ. A second gaze direction with respect to the second view zone VZ2 is depicted as the line connecting the gaze point S and a second intersection point S2, the second gaze direction is outside the display zone DZ.

In some embodiments, when the gaze point is determined to be outside the display zone, the method includes turning off the display device to save energy and extend life time of the display device.

In some embodiments, when the gaze point is determined to be inside the display zone, the method includes turning on the display device to output an image.

Referring to FIG. 11, when the gaze point is determined to be inside the display zone and the display device is turned on to output an image, the method in some embodiments further includes determining whether a depth plane corresponding to the gaze point has a depth equal to or less than a threshold depth. When it is determined that the depth plane corresponding to the gaze point has a depth equal to or less than the threshold depth, the method further includes projecting the image by a projection lens onto a depth plane corresponding to the gaze point.

In some embodiments, when the gaze point is inside the display zone, the method further includes automatically updating the depth plane onto which the image is projected so that the depth plane changes corresponding to a change in the gaze point in real time. In some embodiments, the method includes projecting the image by the projection lens onto a first depth plane corresponding to a first gaze point; detecting a change of the gaze point form the first gaze point to a second gaze point; adjusting the focal length of the projection lens based on the change of the gaze point; and projecting the image onto an adjusted depth plane upon adjusting the focal length. Optionally, the method further includes comparing a depth of a second depth plane corresponding to the second gaze point with a threshold depth, and determining the focal length based on a result of comparing. When it is determined that the depth plane corresponding to the second gaze point has a depth equal to or less than the threshold depth, the step of projecting the image onto the adjusted depth plane includes projecting the image onto the second depth plane corresponding to the second gaze point, i.e., the second depth plane is a depth plane corresponding to the second gaze point.

In some embodiments, switching the projection from the first depth plane to the second depth plane is performed by changing the focal length of the projection lens. In some embodiments, the step of changing the focal length of the projection lens includes determining a first intersection point between a reference plane and the first gaze direction of a first view zone, a second intersection point between the reference plane and the second gaze direction of a second view zone, and a distance between the first intersecting point and the second intersecting point; and determining a distance between the depth plane corresponding to the gaze point and a plane containing the first view zone and the second view zone based on the distance between the first intersecting point and the second intersecting point, a distance between the reference plane and the plane containing the first view zone and the second view zone, and a distance between the first view zone and the second view zone. In some embodiments, the step of determining the distance between the depth plane corresponding to the gaze point and the plane containing the first view zone and the second view zone is performed according to the equation (1):

$$L = \frac{P * D}{P - R}; \tag{1}$$

wherein L stands for the distance between the depth plane corresponding to the gaze point and the plane containing the first view zone and the second view zone, P stands for the distance between the first view zone and the second view zone, D stands for the distance between the reference plane and the plane containing the first view zone and the second view zone, and R stands for the distance between the first intersecting point and the second intersecting point.

In some embodiments, the step of changing the focal length of the projection lens further includes detecting a data including one or a combination of the distance between the depth plane corresponding to the gaze point and the plane containing the first view zone and the second view zone, the distance between the projection lens and the plane containing the first view zone and the second view zone, and the distance between the display device and the projection lens. In some embodiments, the focal length of the projection lens is determined according to the equation (2)

$$f = \frac{N*(L-L0)}{L-L0-N}; \qquad (2)$$

wherein f stands for the focal length of the projection lens, L stands for a distance between the depth plane corresponding to the gaze point and a plane containing a first view zone and a second view zone, L0 stands for a distance between the projection lens and the plane containing the first view zone and the second view zone, N stands for a distance between the display device and the projection lens. In some embodiments, the step of changing the focal length of the projection lens further includes controlling one or any combination of N, L, and L0.

In some embodiments, when it is determined that the depth plane corresponding to the gaze point has a depth greater than the threshold depth, the method includes projecting the image onto a depth plane having a fixed depth greater than the threshold. Referring to FIG. 11, when it is determined that the depth plane corresponding to the gaze point has a depth greater than the threshold depth, the method in some embodiments further includes generating a rendered image based on the image output from the display device; and projecting the image onto the depth plane having a fixed depth greater than the threshold depth. The focal length of the projection lens can be adjusted as described above.

In some embodiments, the step of generating the rendered image includes preparing one or a combination of three-dimensional geometric model information, three-dimensional animation definition information and material information. Optionally, the method further includes obtaining the three-dimensional geometric model information through one or a combination of three-dimensional scanning, three-dimensional interactive geometric modeling, and using a three-dimensional model library. Optionally, the method further includes obtaining the three-dimensional animation definition information through one or a combination of motion design, motion capture, motion calculation, and dynamic deformation techniques. Optionally, the method further includes obtaining the material information from scanned photographs, computerized images, and images drawn by human. Optionally, the step of generating the rendered image includes performing one or a combination of geometric transformation, projection transformation, perspective transformation, and window cropping, as well as using the obtained material information and lighting information. Optionally, the method further includes outputting the rendered image to the projection lens for display.

In another aspect, the present disclosure provides a method of automatically controlling a display device in a virtual image display apparatus based on a gaze direction. In some embodiments, the method includes determining whether a gaze point is outside a display zone of the virtual image display apparatus.

In some embodiments, the method further includes detecting a gaze direction. Optionally, the step of detecting the gaze direction includes tracking a first gaze direction corresponding to a first view zone and a second gaze direction corresponding to a second view zone in real time.

Optionally, the method further includes turning on a display device of the virtual image display apparatus based on a determination that the gaze point is inside the display zone. Optionally, the method further includes turning off a display device of the virtual image display apparatus based on a determination that the gaze point is outside the display zone. Optionally, the method further includes reiterating detecting the gaze direction subsequent to turning off the display device.

In some embodiments, the display device 5 is a display device in the vehicle, e.g., a center console of the vehicle, a GPS of the vehicle, a dashboard of the vehicle. The controller 3 is coupled to the display device in the vehicle.

In another aspect, the present disclosure provides a head-up display apparatus including a virtual image display apparatus described herein.

Figure 13:
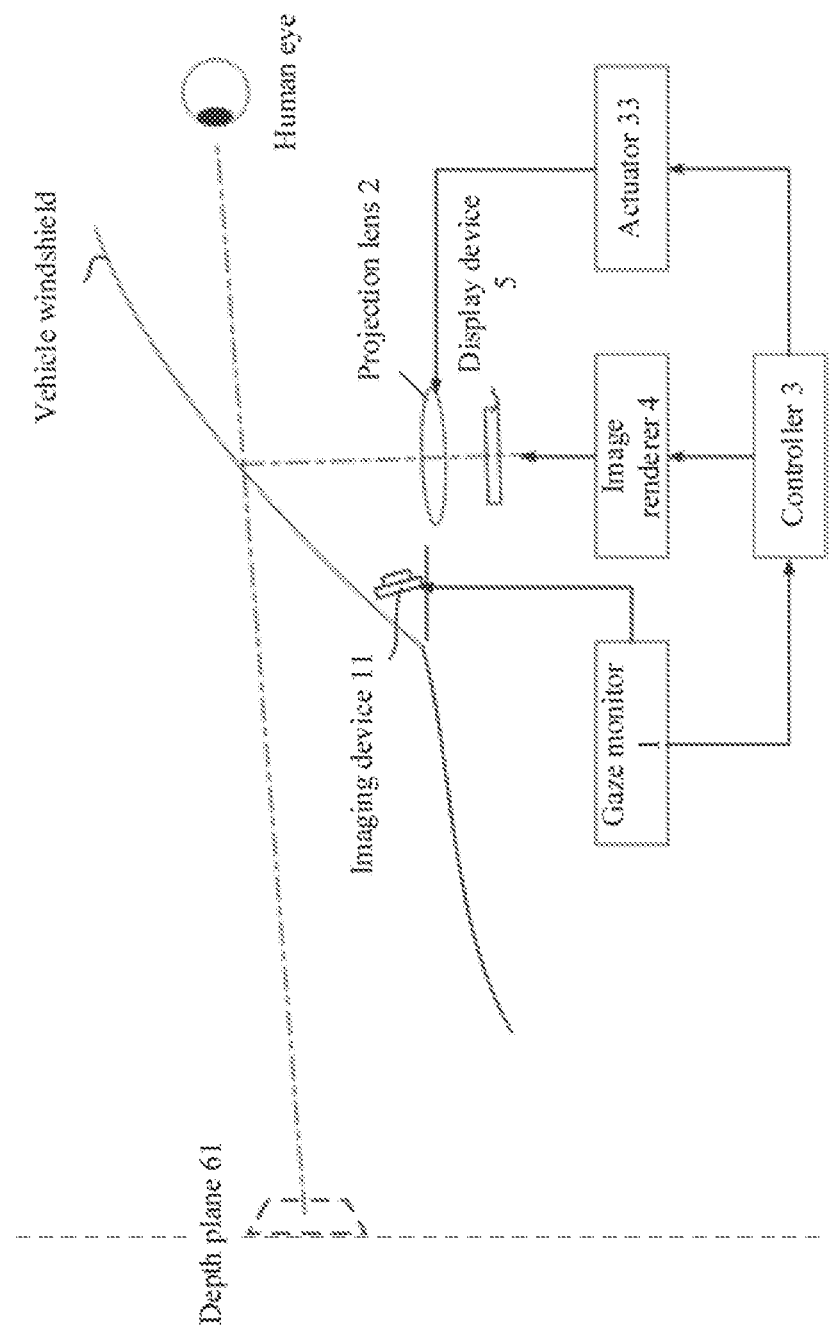
FIG. 13 is a schematic diagram illustrating a vehicle having a head-up display apparatus including a virtual image display apparatus in some embodiments according to the present disclosure.

In another aspect, the present disclosure provides a vehicle having a head-up display apparatus including a virtual image display apparatus described herein. FIG. 13 is a schematic diagram illustrating a vehicle having a head-up display apparatus including a virtual image display apparatus in some embodiments according to the present disclosure.

In another aspect, the present disclosure provides a computer-program product comprising a non-transitory tangible computer-readable medium having instructions thereon. In some embodiments, the instructions include code for causing a gaze monitor to detect a gaze direction and determine a gaze point; and code for causing a controller to control a focal length of a projection lens based on a change of the gaze point. Optionally, the instructions include code for causing the controller to control the focal length of the projection lens based on a change of the gaze point from a first gaze point to a second gaze point so that the projection lens is configured to project the image onto an adjusted depth plane. Optionally, the instructions include code for causing an image renderer to generate a rendered image based on the image output from the display device. Optionally, the instructions include code for causing the controller to turn off the display device based on a change of the gaze direction from the first gaze direction to the second gaze direction when the second gaze point is outside a display zone of the virtual image display apparatus.

In some embodiments, the instructions further include code for causing a processor to determine a first intersection point between a reference plane and the first gaze direction of a first view zone, a second intersection point between the reference plane and the second gaze direction of a second view zone, and a distance between the first intersecting point and the second intersecting point; and determine a distance between the depth plane corresponding to the gaze point and a plane containing the first view zone and the second view zone based on the distance between the first intersecting point and the second intersecting point, a distance between the reference plane and the plane containing the first view zone and the second view zone, and a distance between the first view zone and the second view zone.

In some embodiments, the instructions are stored in one or more memory. Optionally, the one or more memory store computer-executable instructions for controlling one or more processors to perform one or more steps of the method for virtual image display described herein. Various appropriate memory may be used in the present virtual image display apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present virtual image display apparatus. Examples of appropriate processors include, but are not limited to, a general-purpose processor, a central processing unit (CPU), a microprocessor, a digital signal processor (DSP), a controller, a microcontroller, a state machine, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc, following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A virtual image display apparatus, comprising:
   a gaze monitor configured to detect a gaze direction of a user and determine a gaze point based on the gaze direction;
   a display device configured to output an image;
   a projection lens configured to project the image onto a depth plane corresponding to the gaze point; and
   a controller configured to control a focal length of the projection lens based on a change of the gaze point;
   wherein the gaze monitor comprises:
   an imaging device configured to track a first gaze direction and a second gaze direction in real time; and
   a processor configured to:
   determine a first intersection point between a reference plane and the first gaze direction of a first view zone, a second intersection point between the reference plane and the second gaze direction of a second view zone, and a distance between the first intersecting point and the second intersecting point; and
   determine a distance between the depth plane corresponding to the gaze point and a plane containing the first view zone and the second view zone based on the distance between the first intersecting point and the second intersecting point, a distance between the reference plane and the plane containing the first view zone and the second view zone, and a distance between the first view zone and the second view zone;
   wherein the distance between the depth plane corresponding to the gaze point and the plane containing the first view zone and the second view zone is determined according to a following equation:

$$L = \frac{P*D}{P-R};$$

wherein L stands for the distance between the depth plane corresponding to the gaze point and the plane containing the first view zone and the second view zone, P stands for the distance between the first view zone and the second view zone, D stands for the distance between the reference plane and the plane containing the first view zone and the second view zone, and R stands for the distance between the first intersecting point and the second intersecting point.

2. The virtual image display apparatus of claim 1, wherein the projection lens is configured to project the image onto a first depth plane corresponding to a first gaze point; and
   the controller is configured to control the focal length of the projection lens based on the change of the gaze point from the first gaze point to a second gaze point so that the projection lens is configured to project the image onto an adjusted depth plane based on the focal length being adjusted.

3. The virtual image display apparatus of claim 2, wherein a depth of a second depth plane corresponding to the second gaze point is equal to or less than a threshold depth; and
   the adjusted depth plane is the second depth plane corresponding to the second gaze point.

4. The virtual image display apparatus of claim 2, wherein a depth of a second depth plane corresponding to the second gaze point is greater than a threshold depth; and
   the adjusted depth plane is a depth plane having a fixed depth greater than the threshold depth.

5. The virtual image display apparatus of claim 4, further comprising an image renderer configured to generate a rendered image based on an image output from the display device; and
   the projection lens is configured to project the rendered image onto the second depth plane.

6. The virtual image display apparatus of claim 1, wherein the controller is configured to turn off the display device based on a change of the gaze point from a first gaze point to a second gaze point; and
the second gaze point is outside a display zone of the virtual image display apparatus.

7. The virtual image display apparatus of claim 1, wherein a focal length of the projection lens is determined according to a following equation:

$$f = \frac{N*(L-L0)}{L-L0-N};$$

wherein f stands for the focal length of the projection lens, L stands for a distance between the depth plane corresponding to the gaze point and a plane containing a first view zone and a second view zone, L0 stands for a distance between the projection lens and the plane containing the first view zone and the second view zone, N stands for a distance between the display device and the projection lens;
wherein the controller is configured to adjust a focal length of the projection lens by controlling one or any combination of N, L0, and L.

8. A vehicle, comprising a head-up display apparatus comprising the virtual image display apparatus of claim 1.

9. A method for virtual image display, comprising:
detecting a gaze direction;
determining a gaze point based on the gaze direction;
outputting an image by a display device;
projecting the image onto a depth plane corresponding to the gaze point; and
controlling a focal length of a projection lens based on a change of the gaze point;
wherein detecting the gaze direction comprises tracking a first gaze direction and a second gaze direction in real time;
the method further comprises:
determining a first intersection point between a reference plane and the first gaze direction of a first view zone, a second intersection point between the reference plane and the second gaze direction of a second view zone, and a distance between the first intersecting point and the second intersecting point; and
determining a distance between the depth plane corresponding to the gaze point and a plane containing the first view zone and the second view zone based on the distance between the first intersecting point and the second intersecting point, a distance between the reference plane and the plane containing the first view zone and the second view zone, and a distance between the first view zone and the second view zone;
wherein determining the distance between the depth plane corresponding to the gaze point and the plane containing the first view zone and the second view zone is performed according to a following equation:

$$L = \frac{P*D}{P-R};$$

wherein L stands for the distance between the depth plane corresponding to the gaze point and the plane containing the first view zone and the second view zone, P stands for the distance between the first view zone and the second view zone, D stands for the distance between the reference plane and the plane containing the first view zone and the second view zone, and R stands for the distance between the first intersecting point and the second intersecting point.

10. The method of claim 9, further comprising:
projecting the image by the projection lens onto a first depth plane corresponding to a first gaze point;
detecting the change of the gaze point from the first gaze point to a second gaze point;
adjusting the focal length of the projection lens based on the change of the gaze point; and
projecting the image onto an adjusted depth plane based on the focal length being adjusted.

11. The method of claim 10, further comprising comparing a depth of a second depth plane corresponding to the second gaze point with a threshold depth, and determining the focal length based on a result of comparing.

12. The method of claim 11, wherein the depth of the second depth plane is equal to or less than the threshold depth, and the adjusted depth plane is the second depth plane.

13. The method of claim 11, wherein the depth of the second depth plane is greater than the threshold depth, and the adjusted depth plane is a depth plane having a fixed depth greater than the threshold depth.

14. The method of claim 12, further comprising generating a rendered image based on an image output from the display device;
wherein projecting the image onto the second depth plane comprises projecting the rendered image onto the second depth plane.

15. The method of claim 9, further comprising:
determining whether a second gaze point is outside a display zone of a virtual image display apparatus; and
turning off the display device based on a determination that the second gaze point is outside the display zone.

16. The method of claim 9, wherein the focal length of the projection lens is determined according to a following equation:

$$f = \frac{N*(L-L0)}{L-L0-N};$$

wherein f stands for the focal length of the projection lens, L stands for a distance between the depth plane corresponding to the gaze point and a plane containing a first view zone and a second view zone, L0 stands for a distance between the projection lens and the plane containing the first view zone and the second view zone, N stands for a distance between the display device and the projection lens;
wherein controlling the focal length of the projection lens is performed by controlling one or any combination of N, L0, and L.

* * * * *